US 6,618,242 B2

(12) United States Patent
Garel et al.

(10) Patent No.: US 6,618,242 B2
(45) Date of Patent: Sep. 9, 2003

(54) METHOD FOR RETAINING A USER CONFIGURABLE WRIST PAD

(75) Inventors: Michael R. Garel, Austin, TX (US); Jeffrey A. Kurgan, Schaumburg, IL (US); Joseph H. Philippsen, Schaumburg, IL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/957,727

(22) Filed: Sep. 21, 2001

(65) Prior Publication Data

US 2003/0058609 A1 Mar. 27, 2003

(51) Int. Cl.[7] .................................................. G06F 1/16
(52) U.S. Cl. .................... 361/683; 361/680; 248/118.1; 400/715; D14/460
(58) Field of Search ................................ 361/679–686; 248/118, 118.1, 118.3, 918, 631; 400/715, 691, 693; D14/455–461

(56) References Cited

U.S. PATENT DOCUMENTS

| 5,017,030 A | 5/1991 | Crews |
| 5,348,408 A | 9/1994 | Gelardi et al. |
| 5,355,357 A | 10/1994 | Yamamori et al. |
| 5,356,099 A | 10/1994 | Sereboff |
| 5,374,018 A | 12/1994 | Daneshvar |
| 5,388,032 A | 2/1995 | Gill et al. |
| 5,443,237 A | 8/1995 | Stadtmauer |
| 5,503,484 A | 4/1996 | Louis |
| 5,522,572 A | 6/1996 | Copeland et al. |
| 5,547,154 A | 8/1996 | Kirchhoff et al. |
| 5,592,362 A | 1/1997 | Ohgami et al. |
| 5,596,481 A | 1/1997 | Liu et al. |
| 5,596,482 A | 1/1997 | Horikoshi |
| 5,641,588 A | * 6/1997 | Sieminski et al. .......... 361/683 |
| 5,724,224 A | 3/1998 | Howell et al. |
| 5,775,822 A | 7/1998 | Cheng |
| 5,803,416 A | 9/1998 | Hanson et al. |
| 5,835,344 A | 11/1998 | Alexander |
| 5,905,632 A | 5/1999 | Seto et al. |
| 5,971,332 A | * 10/1999 | Sun et al. .................... 248/118 |
| 6,134,104 A | 10/2000 | Mohi et al. |
| 6,195,255 B1 | * 2/2001 | Kim ........................... 361/683 |
| 6,216,988 B1 | * 4/2001 | Hsu et al. .................... 248/118 |
| 6,237,879 B1 | * 5/2001 | Budge ......................... 248/118 |
| 6,336,614 B1 | * 1/2002 | Kwitek ....................... 248/118 |
| 6,385,037 B2 | * 5/2002 | Howell et al. .............. 361/683 |
| 6,398,171 B1 | * 6/2002 | Cheng ......................... 248/118 |
| 6,462,937 B1 | * 10/2002 | Liao et al. ................... 361/680 |

* cited by examiner

Primary Examiner—Darren Schuberg
Assistant Examiner—Lisa Lea Edmonds
(74) Attorney, Agent, or Firm—Haynes and Boone, L.L.P.

(57) ABSTRACT

A customer configured computer includes a keyboard having an exterior surface and input components mounted on a portion of the exterior surface. A user wrist rest area is adjacent the keyboard and includes a pad retention apparatus having a base member with a protruding contoured surface and a peripheral edge extending from the contoured surface; a resilient pad member covering the contoured surface and having a terminal edge extending toward the peripheral edge; and a frame member attached to the peripheral edge and securing the terminal edge of the resilient pad member between the frame member and the base member.

21 Claims, 4 Drawing Sheets

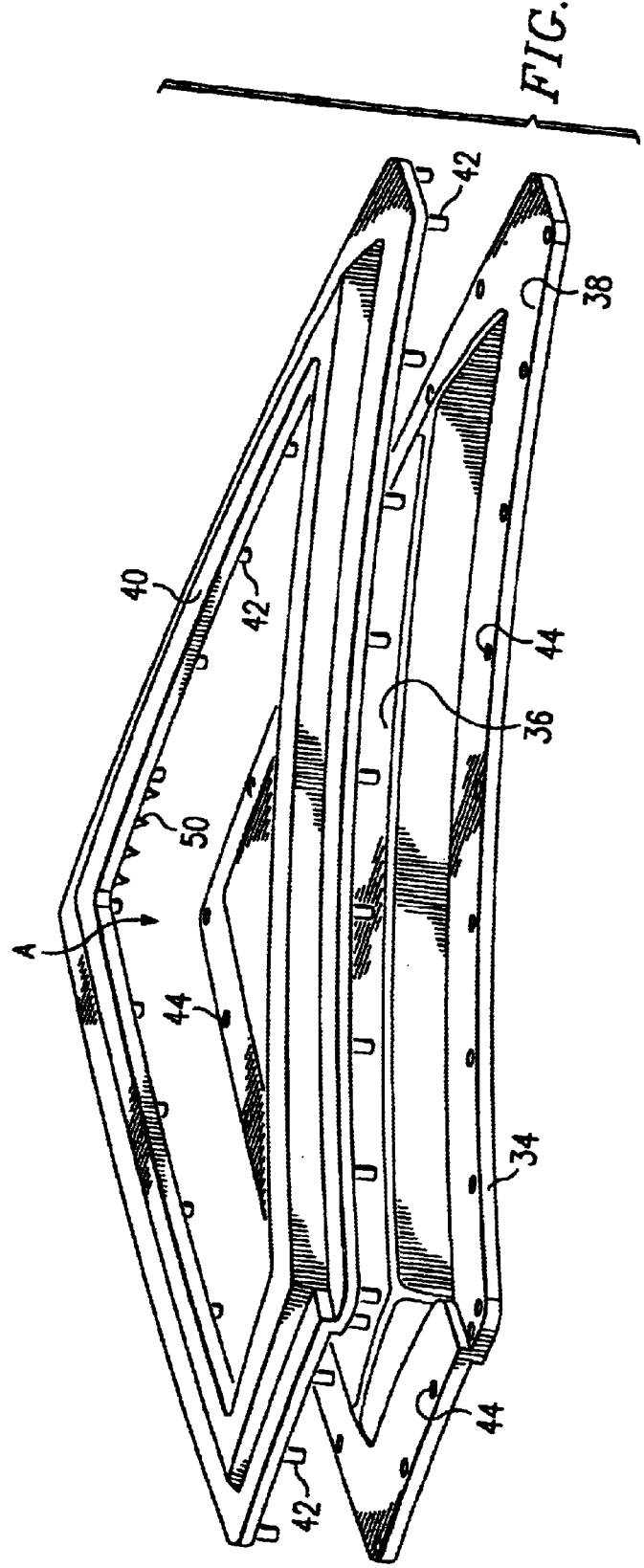

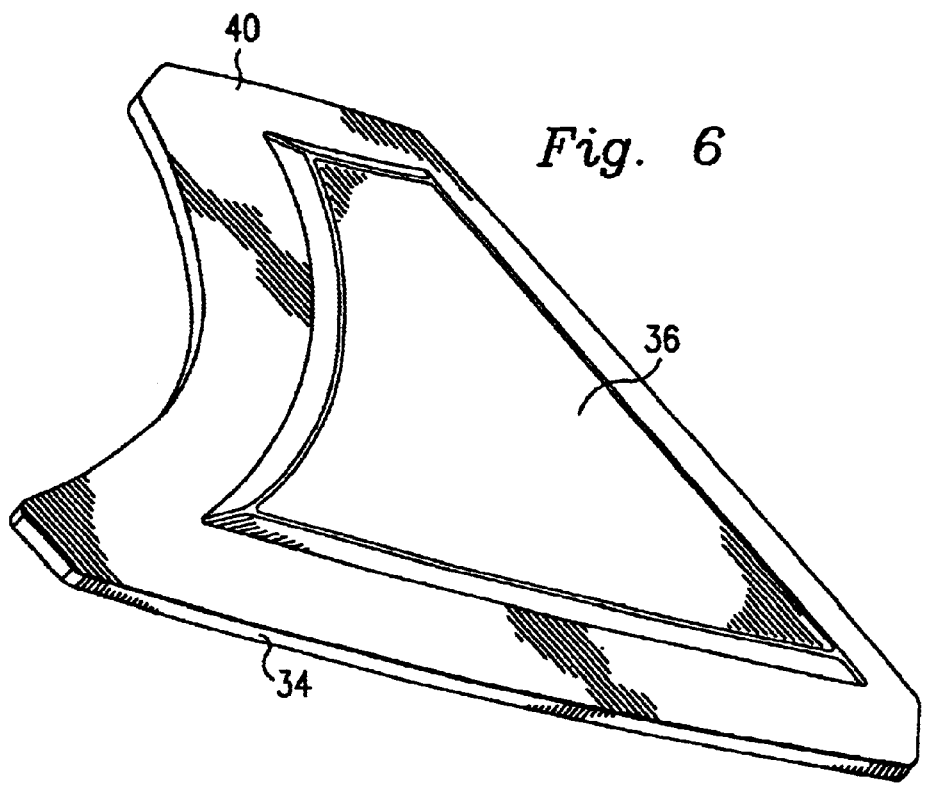
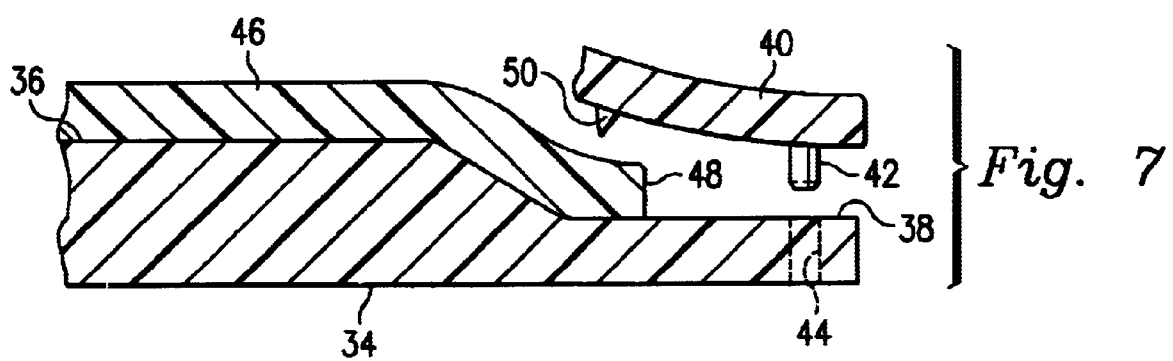

US 6,618,242 B2

METHOD FOR RETAINING A USER CONFIGURABLE WRIST PAD

BACKGROUND

The disclosures herein relate generally to palm or wrist rests for a portable computer system, and more particularly to a method of retaining a user configurable pad.

As portable computer systems become intrinsically more advanced, the external features of the systems must be accordingly updated to reflect user trends. These external features not only serve the aesthetic function of portraying individuality of portable computer systems, but also serve the aesthetic function of providing an ergonomic interface to the portable computer user. One of the paramount aesthetic and design considerations of these external features is the material and orientation of pads used for the palm or wrist rest. Allowable space in which the pad will engage the portable computer, and the costs requirements of such a pad are concerns which need to be addressed in the design of these pads.

In the past, palm or wrist rests have been made of glued on foam type material, closed-cell foam, fabric-covered padding, vinyl-covered padding, or leather covered padding. These pads are not adequate as they are easily worn and are not efficiently manufactured.

Therefore, what is needed is an apparatus and method to retain a resilient pad material while maintaining tolerance requirements.

SUMMARY

One embodiment, accordingly, is a pad retention apparatus comprising a base member including a protruding contoured surface and a peripheral edge extending from the contoured surface. A resilient pad member is supported by the contoured surface and has a terminal edge extending toward the peripheral edge. A frame member is attached to the peripheral edge and secures the terminal edge of the pad between the frame member and the base member.

Several advantages are achieved by the apparatus and method according to the illustrative embodiments presented herein. Die-cut gel materials are less expensive than molded gel parts. Furthermore, die-cut gel materials are more resilient and provide for a more aesthetically pleasing user interface, while still providing the value of being user configurable.

BRIEF DESCRIPTION OF THE DRAWINGS

FIG. 5 is a perspective view illustrating an embodiment of the base member and an unattached frame member.

FIG. 6 is a perspective view illustrating an embodiment of the attached base member and frame member without a pad member.

FIG. 7 is a partial cross-sectional side view illustrating the base member supporting the pad member and further illustrating an unattached frame member.

DETAILED DESCRIPTION

Figure 1:
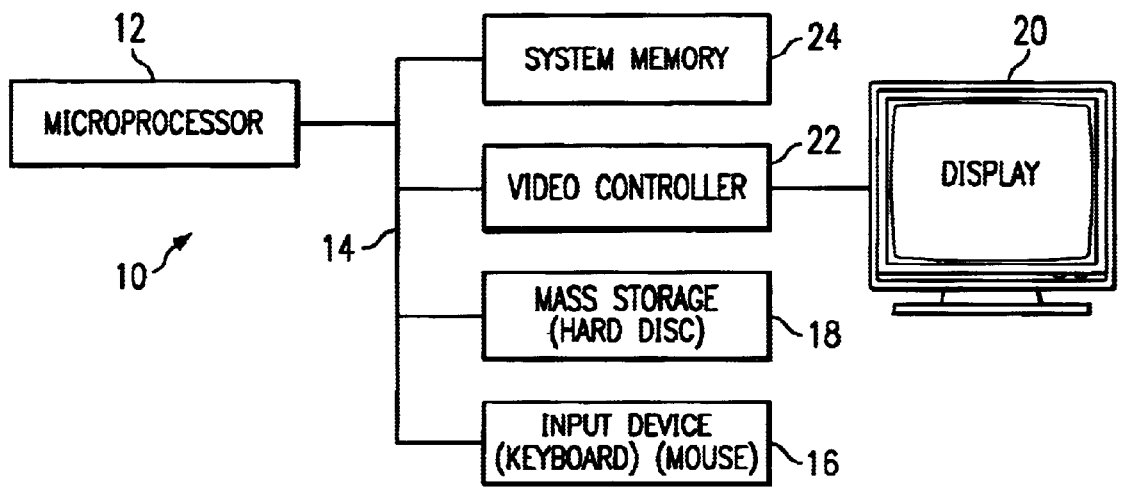
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
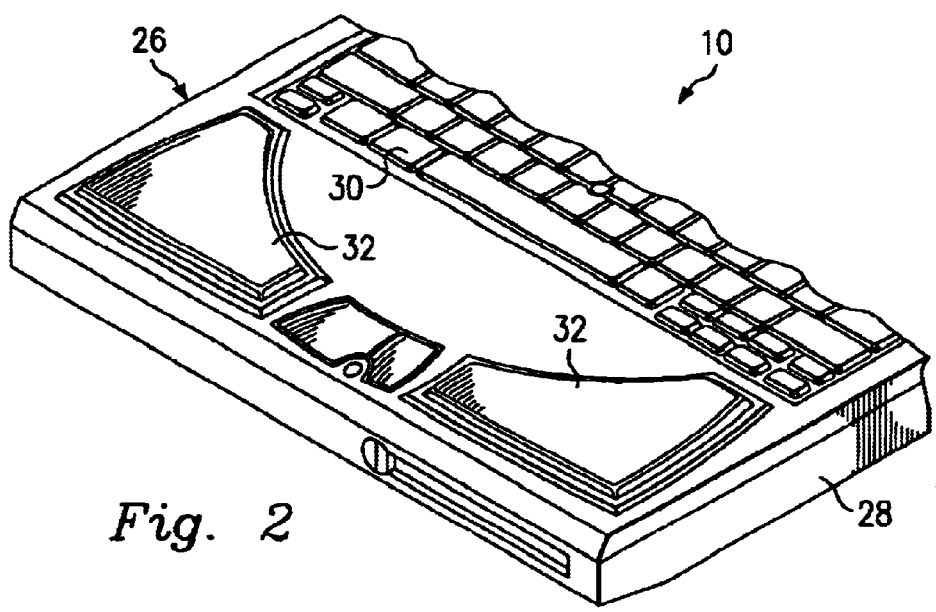
FIG. 2 is a perspective view illustrating an embodiment of a portable computer.
Figure 3:
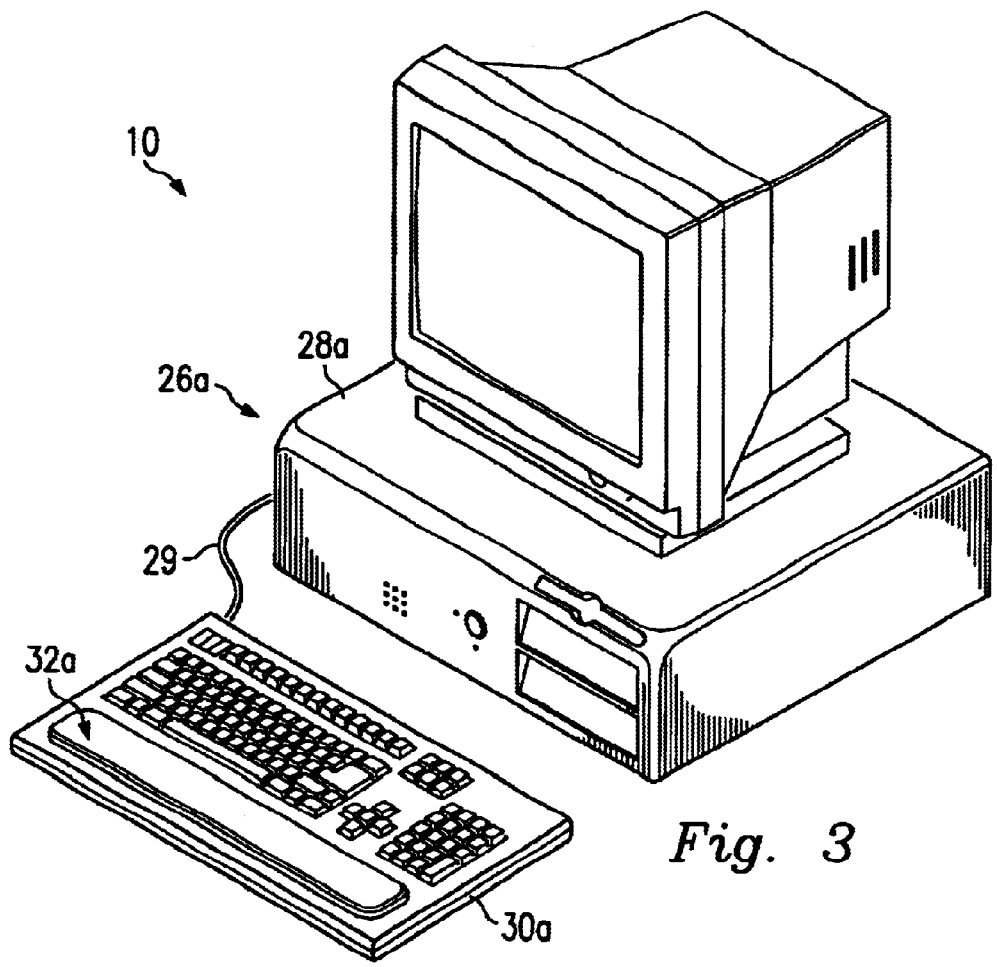
FIG. 3 is a perspective view illustrating an embodiment of a desktop computer.

Referring to FIG. 2, illustrated is a portable, notebook size computer designated 26 comprising a self-contained system, such as that illustrated at 10 in FIG. 1. Computer 26 includes a chassis 28 having a keyboard 30 mounted thereon and a plurality of wrist rest pads 32 mounted on chassis 28 adjacent the keyboard 30. In FIG. 3, a desktop computer 26a, comprises a system such as that illustrated at 10 and includes a chassis 28a. A keyboard 30a is separate from chassis 28a, but is coupled to chassis 28a by a coupling means 29. Keyboard 30a includes a wrist rest pad 32a.

Figure 4:
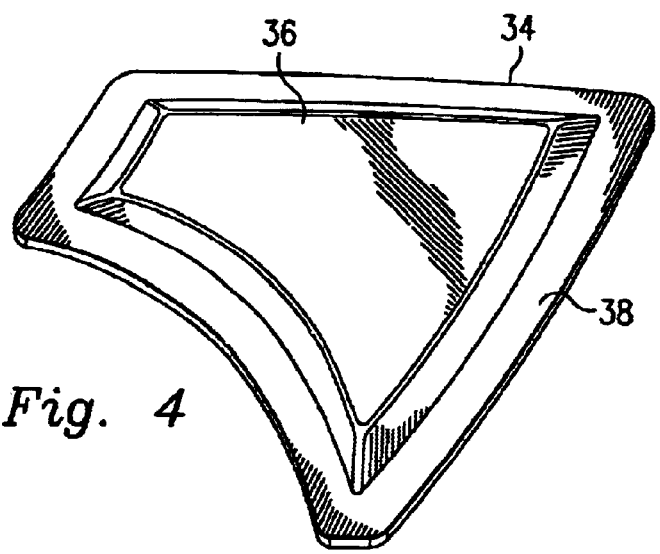
FIG. 4 is a perspective view illustrating an embodiment of a base member.

Although the present disclosure has applicability to either the wrist rests 32 or the wrist rest 32a, only the wrist rests 32 will be discussed further. As illustrated in FIG. 4, a component of wrist rest 32 is a base member 34 including a raised or protruding contoured surface 36 and a peripheral edge 38 extending from the contoured surface 36. The base member 34 can be a part of the computer chassis 28 or can be a separately molded piece as illustrated in FIG. 4. Base member 34 is preferably molded of a suitable plastic material and can be a removable snap-in component of the chassis 28.

A preferably molded plastic frame member 40, FIGS. 5, 6 and 7, is provided for attachment to the peripheral edge 38 of base member 34, so that when attached, the contoured surface 36 protrudes within an area A defined by frame member 40. The frame member 40 includes a plurality of tabs 42 for engagement with a plurality of apertures 44 formed in peripheral edge 38 of base member 34. The tabs 42 may be heat staked in apertures 44 or may be releasably snapped-in to the apertures 44.

A resilient pad member 46, FIG. 7, preferably a die-cut piece of a suitable gel pad, is supported by the contoured surface 36. The resilient pad member 46 includes a terminal edge 48 which extends toward the peripheral edge 38 of base member 34. Thus, the pad member 46 is sandwiched between the frame member 40 and the attached peripheral edge of the base member 34. A plurality of protrusions such as teeth 50, FIGS. 5 and 7, may extend from frame member 40. Teeth 50 will engage pad member 46 when frame member 40 is attached to base member 34 and enhance the retention of the pad member 46 by the frame member 40 and the base member 34. It is understood that any suitable resilient or cushioning pad material can be used as pad member 46, however, the die cut gel pad member 46 is preferred. In addition, pad member 46 can be formed of any customer selected material or customer selected color so as to personally configure the wrist rest 32. The wrist rest 32 can be pre-assembled and attached to the computer chassis 28. Also, the wrist rest is easily removable and pad member 46 can be easily changed or replaced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A gel pad retention apparatus comprising:
    a base member including a protruding contoured surface and a peripheral edge extending from the contoured surface;
    a resilient pad member supported by the contoured surface and having a terminal edge extending toward the peripheral edge; and
    a frame member attached to the peripheral edge and securing the terminal edge of the resilient pad member between the frame member and the base member.

2. The apparatus as defined in claim 1 wherein the base member is releasably attached to the frame member.

3. The apparatus as defined in claim 1 wherein the base member is heat staked to the frame member.

4. The apparatus as defined in claim 1 wherein the frame member includes a protrusion for engaging the resilient pad.

5. The apparatus as defined in claim 4 wherein the protrusion includes a plurality of teeth.

6. A customer configured computer comprising:
    a keyboard including an exterior surface and input components mounted on a portion of the exterior surface;
    a user wrist rest area adjacent the keyboard, including a pad retention apparatus including:
        a base member having a protruding contoured surface and a recessed peripheral edge extending from the contoured surface;
        a resilient pad member supported by the contoured surface and having a terminal edge extending toward the peripheral edge; and
        a frame member attached to the peripheral edge and securing the terminal edge of the resilient pad member between the frame member and the base member.

7. The computer as defined in claim 6 wherein the base member is releasably attached to the frame member.

8. The computer as defined in claim 6 wherein the base member is heat staked to the frame member.

9. The computer as defined in claim 6 wherein the frame member includes a protrusion for engaging the resilient pad.

10. The computer as defined in claim 9 wherein the protrusion includes a plurality of teeth.

11. The computer as defined in claim 6 further comprising:
    a portable computer chassis, the keyboard being on the chassis; and
    the base member being releasably attached to the chassis.

12. The system as defined in claim 11 wherein the base member is releasably attached to the frame member.

13. The system as defined in claim 11 wherein the base member is heat staked to the frame member.

14. The system as defined in claim 11 wherein the frame member includes a protrusion for engaging the resilient pad.

15. The system as defined in claim 14, wherein the protrusion includes a plurality of teeth.

16. The system as defined in claim 11 wherein the base member is releasably attached to the chassis.

17. The computer as defined in claim 11 wherein the keyboard is separated from and coupled to the chassis and the base member is mounted adjacent the keyboard.

18. A computer system comprising:
    a chassis having an exterior surface;
    a microprocessor mounted in the chassis;
    a storage coupled to the microprocessor;
    a keyboard including input components mounted on a portion of the exterior surface;
    a user wrist rest area adjacent the keyboard, including a pad retention apparatus including:
        a base member having a protruding contoured surface and a recessed peripheral edge extending from the contoured surface;
        a resilient pad member supported by the contoured surface and having a terminal edge extending toward the peripheral edge; and
        a frame member attached to the peripheral edge and securing the terminal edge of the resilient pad member between the frame member and the base member.

19. A method of retaining a customer configured wrist pad for a computer system comprising:
    providing a base member including a protruding contoured surface and a recessed peripheral edge extending from the contoured surface;
    covering the contoured surface with a resilient pad member having a terminal edge extending toward the peripheral edge; and
    attaching a frame member to the peripheral edge and securing the terminal edge of the resilient pad member between the frame member and the base member.

20. The method as defined in claim 19 wherein the pad member is formed of a customer selected material.

21. The method as defined in claim 20 wherein the pad member material is of a customer selected color.

* * * * *